(12) United States Patent
Park

(10) Patent No.: US 9,976,722 B2
(45) Date of Patent: May 22, 2018

(54) DISPLAY DEVICE AND LIGHT CONVERSION MEMBER

(75) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 278 days.

(21) Appl. No.: 14/006,417

(22) PCT Filed: Mar. 21, 2012

(86) PCT No.: PCT/KR2012/002021
§ 371 (c)(1),
(2), (4) Date: Sep. 20, 2013

(87) PCT Pub. No.: WO2012/128551
PCT Pub. Date: Sep. 27, 2012

(65) Prior Publication Data
US 2014/0009959 A1 Jan. 9, 2014

(30) Foreign Application Priority Data

Mar. 22, 2011 (KR) .................. 10-2011-0025529

(51) Int. Cl.
*F21V 7/04* (2006.01)
*F21V 9/08* (2018.01)
(Continued)

(52) U.S. Cl.
CPC .................. *F21V 9/08* (2013.01); *F21V 9/16* (2013.01); *G02F 1/133615* (2013.01);
(Continued)

(58) Field of Classification Search
CPC ....... G02B 6/0026; G02B 6/0023; F21V 9/08; F21V 9/16; F21V 9/10; F21V 9/12; G02F 1/133617; G02F 1/133621; G02F 2001/133614; G02F 1/133615; F02F 2001/133614
(Continued)

(56) References Cited

U.S. PATENT DOCUMENTS 2,379,342 A * 6/1945 Cozzoli ................... B65B 7/161
53/440
3,653,500 A * 4/1972 Allisbaugh ............. A61J 3/071
206/524.7
(Continued)

FOREIGN PATENT DOCUMENTS

JP          2009-200534 A    9/2009
KR     10-2009-0082497 A    7/2009
(Continued)

*Primary Examiner* — Bryon T Gyllstrom
*Assistant Examiner* — James Endo
(74) *Attorney, Agent, or Firm* — Birch, Stewart, Kolasch & Birch, LLP

(57) ABSTRACT

A display device includes a light source, and a light conversion member to convert a wavelength of light generated from the light source. The light conversion member includes a first region to convert first light generated from the light source into a second light, and a second region to convert the first light generated from the light source into a third light. The second light has a wavelength longer than that of the third light. The first region is closer to the light source than the second region.

7 Claims, 7 Drawing Sheets

(51) Int. Cl.
*F21V 9/16* (2006.01)
*G02F 1/1335* (2006.01)
*F21V 8/00* (2006.01)
*F21Y 115/10* (2016.01)

(52) U.S. Cl.
CPC ..... *G02F 1/133617* (2013.01); *F21Y 2115/10* (2016.08); *G02B 6/0026* (2013.01); *G02F 2001/133614* (2013.01)

(58) Field of Classification Search
USPC ................................ 362/601, 606, 607, 608
See application file for complete search history.

(56) References Cited

U.S. PATENT DOCUMENTS

| | | | | |
|---|---|---|---|---|
| 6,637,905 | B1* | 10/2003 | Ng et al. ........................ | 362/601 |
| 7,105,863 | B1* | 9/2006 | Ng ............................ | H01L 33/56 |
| | | | | 257/100 |
| 7,639,318 | B2* | 12/2009 | Takeuchi et al. ............... | 349/61 |
| 7,819,539 | B2 | 10/2010 | Kim et al. | |
| 8,084,934 | B2* | 12/2011 | Kim ..................... | C09K 11/025 |
| | | | | 313/501 |
| 8,164,825 | B2 | 4/2012 | Narendran et al. | |
| 8,517,551 | B2* | 8/2013 | Tsukahara ................. | B32B 9/00 |
| | | | | 362/246 |
| 2007/0210326 | A1* | 9/2007 | Kurihara ................ | G02B 6/005 |
| | | | | 257/98 |
| 2008/0012031 | A1* | 1/2008 | Jang ....................... | C09K 11/02 |
| | | | | 257/89 |
| 2008/0013335 | A1* | 1/2008 | Tsutsumi ............. | B60Q 1/2607 |
| | | | | 362/545 |
| 2008/0029720 | A1* | 2/2008 | Li ................... | 250/581 |
| 2008/0049443 | A1* | 2/2008 | Lee ............................... | 362/608 |
| 2008/0111145 | A1* | 5/2008 | Lin ........................ | H01L 33/507 |
| | | | | 257/98 |
| 2008/0231162 | A1* | 9/2008 | Kurihara ................... | F21V 9/10 |
| | | | | 313/487 |
| 2009/0316383 | A1* | 12/2009 | Son et al. ........................ | 362/84 |
| 2010/0002413 | A1* | 1/2010 | Igarashi ............. | C09K 11/0883 |
| | | | | 362/84 |
| 2010/0051898 | A1* | 3/2010 | Kim ........................ | C09K 11/02 |
| | | | | 257/9 |
| 2010/0117106 | A1* | 5/2010 | Trottier ................. | H01L 33/508 |
| | | | | 257/98 |
| 2010/0155749 | A1* | 6/2010 | Chen .................... | C09K 11/025 |
| | | | | 257/89 |
| 2010/0157572 | A1* | 6/2010 | Wei .......................... | F21V 9/10 |
| | | | | 362/84 |
| 2010/0232133 | A1* | 9/2010 | Tran et al. ...................... | 362/84 |
| 2010/0283914 | A1* | 11/2010 | Hamada ......................... | 348/731 |
| 2010/0328925 | A1* | 12/2010 | Hoelen et al. .................. | 362/84 |
| 2010/0328926 | A1* | 12/2010 | Hoelen ............... | C09K 11/7774 |
| | | | | 362/84 |
| 2011/0037926 | A1* | 2/2011 | Tsukahara ............ | G02B 6/0023 |
| | | | | 349/64 |
| 2011/0309325 | A1* | 12/2011 | Park et al. ..................... | 257/13 |
| 2012/0074833 | A1* | 3/2012 | Yuan et al. ..................... | 313/483 |
| 2012/0080998 | A1* | 4/2012 | Yu et al. ........................ | 313/483 |

FOREIGN PATENT DOCUMENTS

| | | |
|---|---|---|
| KR | 10-2010-0029519 A | 3/2010 |
| KR | 10-2010-0046698 A | 5/2010 |
| TW | 200629597 A | 8/2006 |

\* cited by examiner

[Fig. 1]
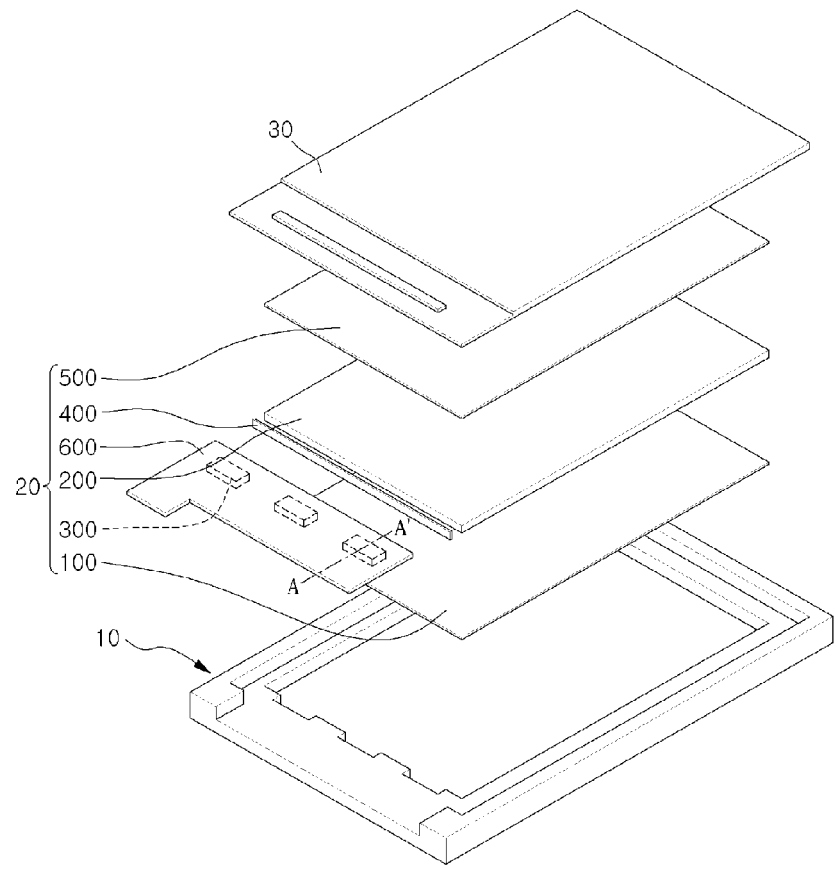
[Fig. 2]
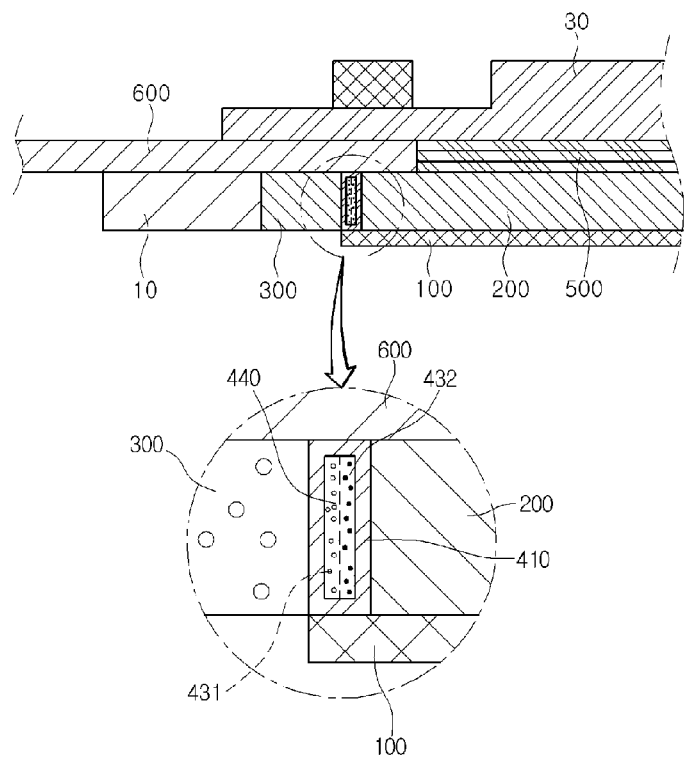

[Fig. 3]
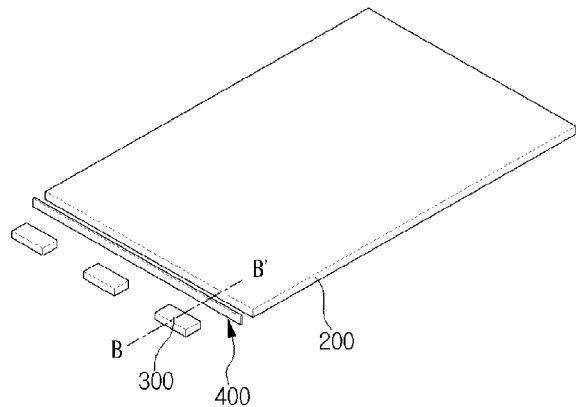
[Fig. 4]
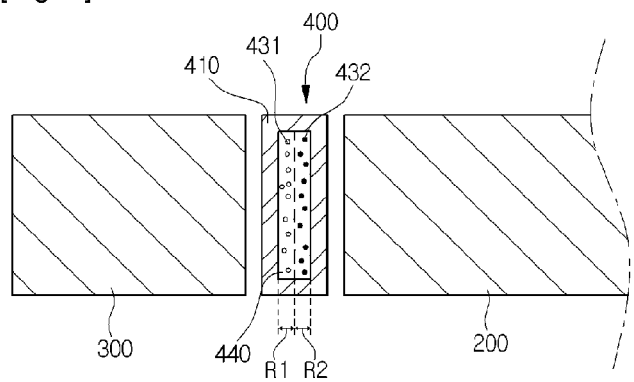
[Fig. 5]
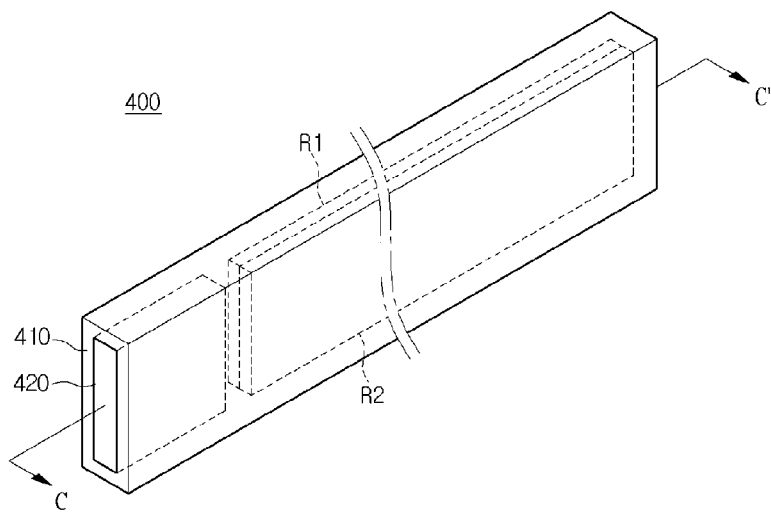
[Fig. 6]
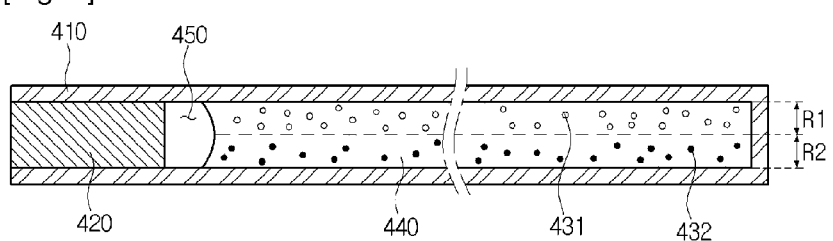

[Fig. 7]
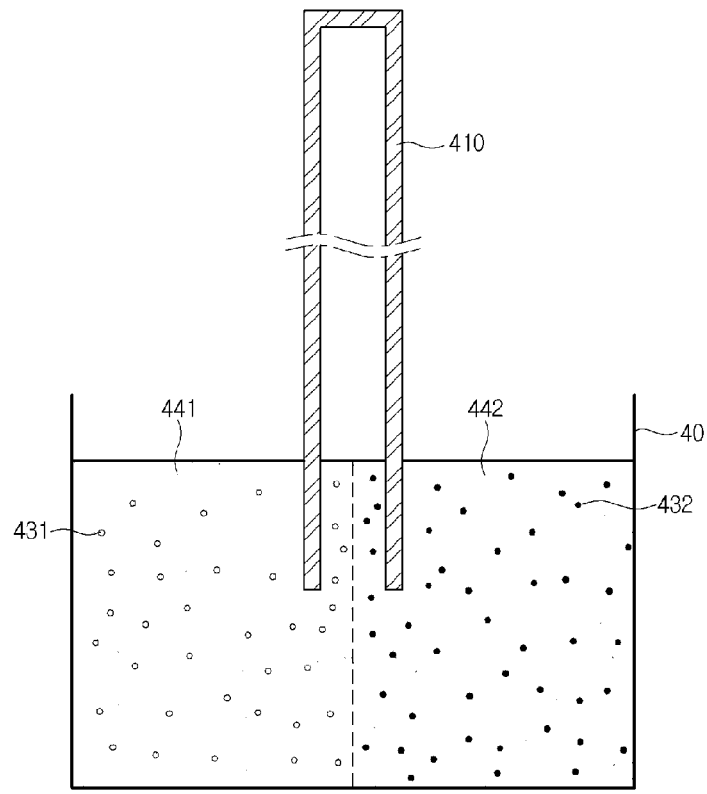
[Fig. 8]
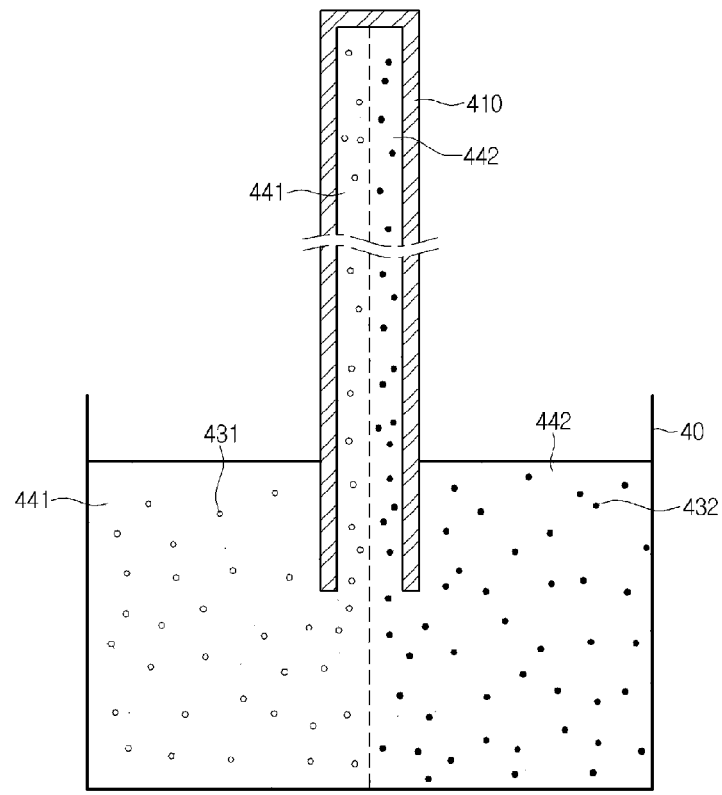

[Fig. 9]
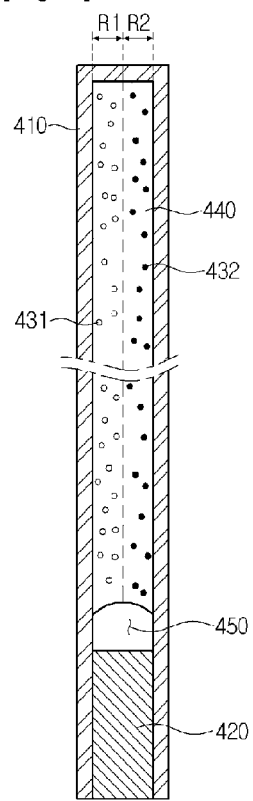
[Fig. 10]
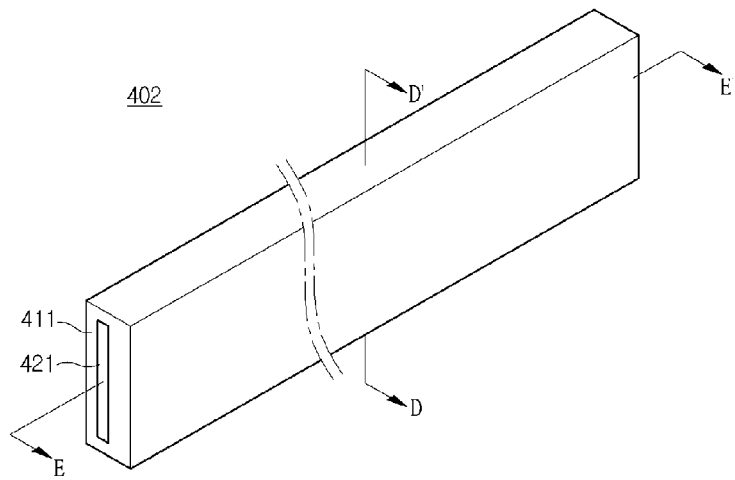
[Fig. 11]
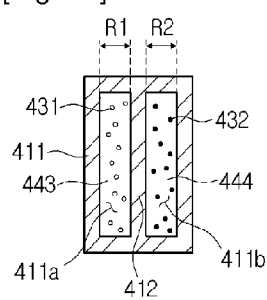

[Fig. 12]
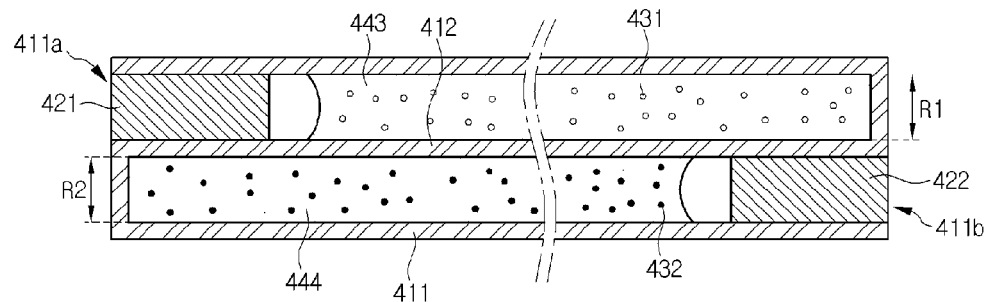
[Fig. 13]
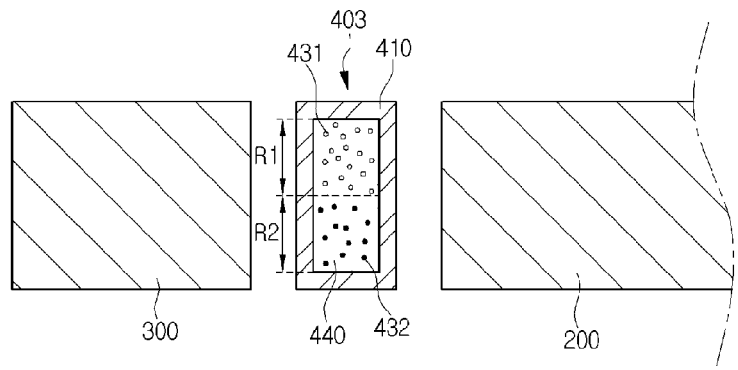
[Fig. 14]
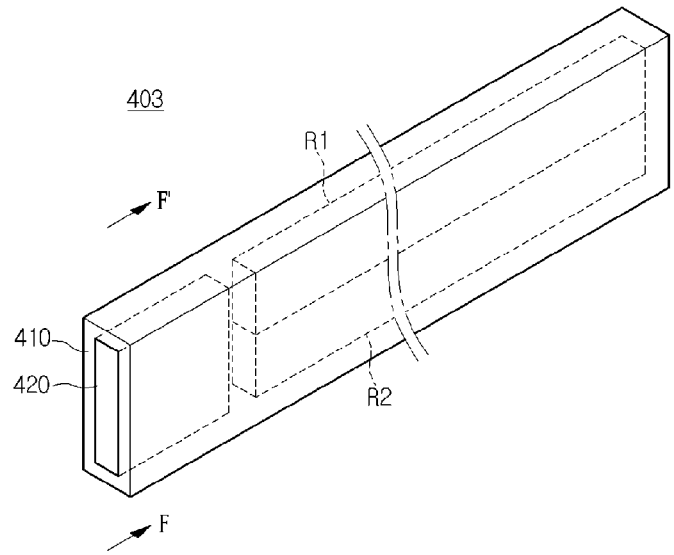
[Fig. 15]
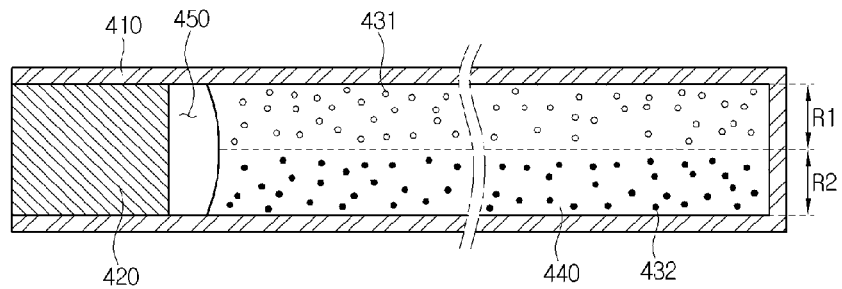

[Fig. 16]
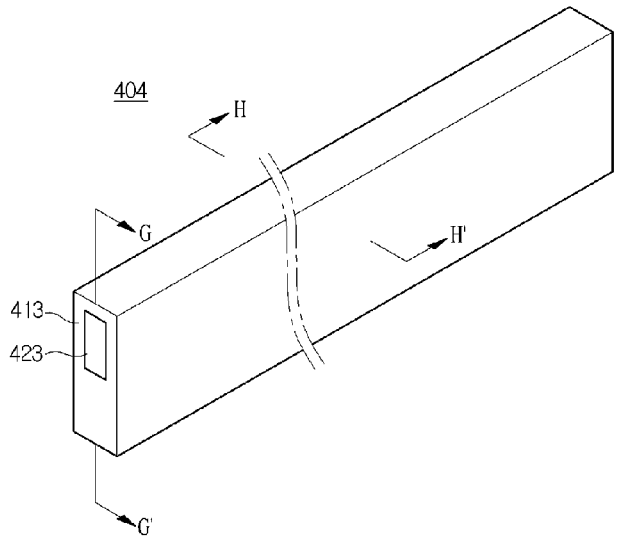
[Fig. 17]
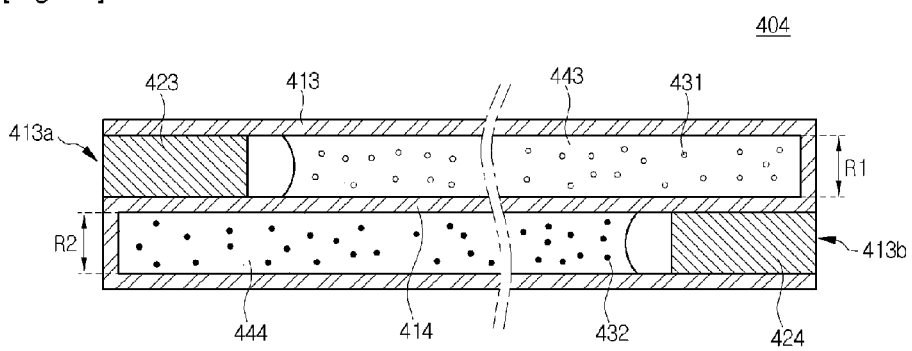
[Fig. 18]
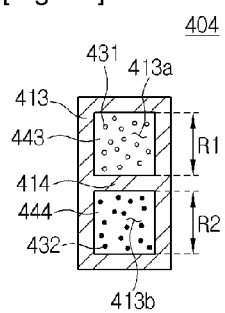
[Fig. 19]
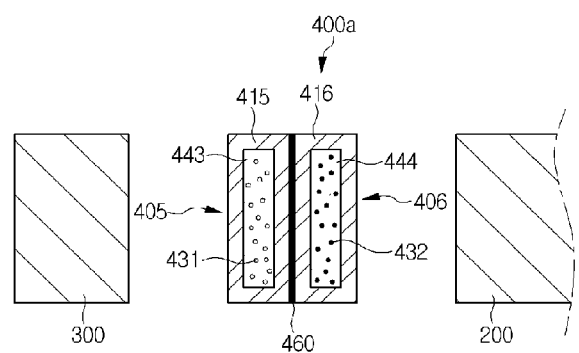

[Fig. 20]
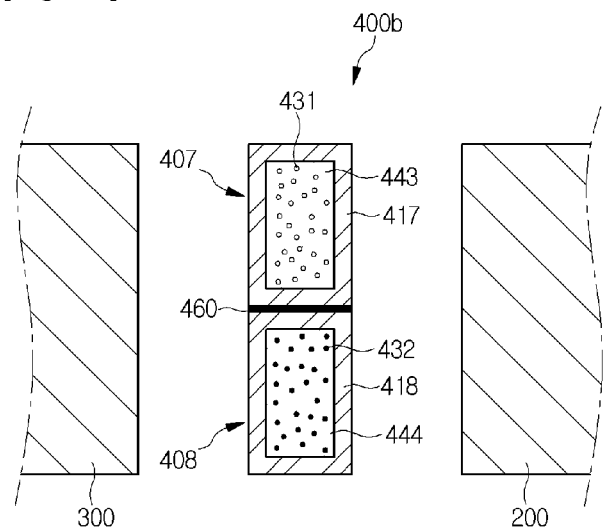
[Fig. 21]
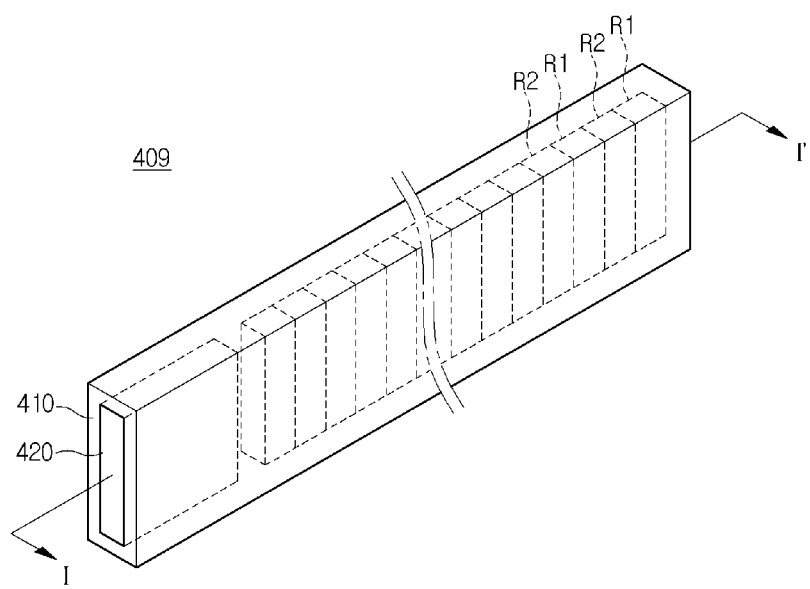
[Fig. 22]
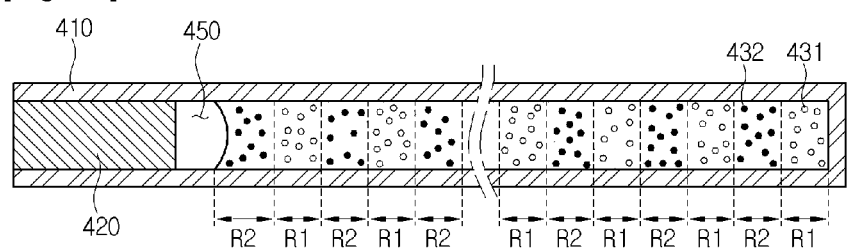

DISPLAY DEVICE AND LIGHT CONVERSION MEMBER

TECHNICAL FIELD

The embodiment relates to a display device and a light conversion member.

BACKGROUND ART

A light emitting diode (LED) is a semiconductor device that converts electricity into ultraviolet ray, visible ray or infrared ray by using characteristics of compound semiconductors. The LED is mainly used for home appliances, remote controllers and large-size electric signboards.

A high-brightness LED is used as a light source for a lighting device. Since the LED represents the superior energy efficiency and long life span, the replacement cost thereof may be reduced. In addition, the LED is strong against vibration and impact and it is not necessary to use toxic substances, such as Hg, so the LED substitutes for a glow lamp and a fluorescent lamp in terms of energy saving, environmental protection and cost reduction.

In addition, the LED may be advantageously used as a light source for a middle-size or large-size LCD TV and a monitor. When comparing with a cold cathode fluorescent lamp (CCFL) mainly used in a liquid crystal display (LCD), the LED represents superior color purity and low power consumption and can be fabricated in a small size, so various products equipped with the LED have been produced and studies for the LED have been actively performed.

DISCLOSURE OF INVENTION

Technical Problem

The embodiment provides a display device having improved reliability and a light conversion member.

Solution to Problem

A display device according to the embodiment includes a light source; and a light conversion member to convert a wavelength of light generated from the light source, wherein the light conversion member includes a first region to convert first light generated from the light source into second light; and a second region to convert the first light generated from the light source into third light.

A light conversion member according to the embodiment includes a tube; a plurality of first light conversion particles disposed in a first region in the tube; and a plurality of second light conversion particles disposed in a second region in the tube.

Advantageous Effects of Invention

The display device according to the embodiment can convert the light generated from the light source into the light having a first color in a first region and convert the light into the light having a second color in a second region. That is, the light conversion member according to the embodiment can convert the incident light into lights having colors different from each other in various regions.

The display device according to the embodiment can convert the light generated from the light source into the lights having various colors. Thus, the display device according to the embodiment can improve the light conversion efficiency.

Especially, if the conversion regions are not classified based on colors, the light generated from the light source is converted into the green light and then the green light is converted into the red light. According to the display device of the embodiment, the conversion regions are classified based on the colors, so the above problem can be solved.

Therefore, the display device according to the embodiment can reduce the energy loss, which is caused when the wavelength is converted by at least two times, and can improve the brightness.

BRIEF DESCRIPTION OF DRAWINGS

FIG. 1 is an exploded perspective view showing an LCD according to the first embodiment;

FIG. 2 is a sectional view taken along line A-A' of FIG. 1;

FIG. 3 is a perspective view showing a light emitting diode, a light conversion member and a light guide plate;

FIG. 4 is a sectional view taken along line B-B' of FIG. 3;

FIG. 5 is a perspective view showing a light conversion member;

FIG. 6 is a sectional view taken along line C-C' of FIG. 5;

FIGS. 7 to 9 are sectional views showing the manufacturing process for a light conversion member according to the first embodiment;

FIG. 10 is a perspective view showing a light conversion member according to the second embodiment;

FIG. 11 is a sectional view taken along line D-D' of FIG. 10;

FIG. 12 is a sectional view taken along line E-E' of FIG. 10;

FIG. 13 is a sectional view showing a light emitting diode, a light conversion member and a light guide plate according to the third embodiment;

FIG. 14 is a perspective view showing a light conversion member according to the third embodiment;

FIG. 15 is a sectional view taken along line F-F' of FIG. 14;

FIG. 16 is a perspective view showing a light conversion member according to the fourth embodiment;

FIG. 17 is a sectional view taken along line G-G' of FIG. 16;

FIG. 18 is a sectional view taken along line H-H' of FIG. 16;

FIG. 19 is a sectional view showing a light emitting diode, a light conversion member and a light guide plate according to the fifth embodiment;

FIG. 20 is a sectional view showing a light emitting diode, a light conversion member and a light guide plate according to the sixth embodiment;

FIG. 21 is a perspective view showing a light conversion member according to the seventh embodiment; and FIG. 22 is a sectional view taken along line I-I' of FIG. 21.

MODE FOR THE INVENTION

In the description of the embodiments, it will be understood that when a substrate, a frame, a sheet, a layer or a pattern is referred to as being "on" or "under" another substrate, another frame, another sheet, another layer, or another pattern, it can be "directly" or "indirectly" on the other substrate, frame, sheet, layer, or pattern, or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

FIG. 1 is an exploded perspective view showing an LCD according to the first embodiment, FIG. 2 is a sectional view taken along line A-A' of FIG. 1, FIG. 3 is a perspective view showing a light emitting diode, a light conversion member and a light guide plate, FIG. 4 is a sectional view taken along line B-B' of FIG. 3, FIG. 5 is a perspective view showing a light conversion member, and FIG. 6 is a sectional view taken along line C-C' of FIG. 5.

Referring to FIGS. 1 to 6, the LCD according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, light emitting diodes 300, a light conversion member 400, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 receives the light from the light emitting diodes 300 and guides the light upward by reflecting, refracting and scattering the light.

The light guide plate 200 includes an incident surface facing the light emitting diodes 300. Among the lateral sides of the light guide plate 200, a lateral side facing the light emitting diodes 300 is the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the light conversion member 400.

The light emitting diodes 300 generates a first light. For instance, the first light may be a blue light. That is, the light emitting diodes 300 are blue light emitting diodes that emit the blue light. The first light is the blue light having the wavelength band of about 430 nm to about 470 nm.

The light emitting diodes 300 are mounted on the FPCB 600. The light emitting diodes 300 can be disposed under the FPCB 600. The light emitting diodes 300 are driven by receiving a driving signal through the FPCB 600.

The light conversion member 400 is disposed between the light emitting diodes 300 and the light guide plate 200. The light conversion member 400 is bonded to the lateral side of the light guide plate 200. In detail, the light conversion member 400 is attached to the incident surface of the light guide plate 200. In addition, the light conversion member 400 can be bonded to the light emitting diodes 300.

The light conversion member 400 receives the light from the light emitting diodes 300 to convert the wavelength of the light. For instance, the light conversion member 400 can convert the first light emitted from the light emitting diodes 300 into second and third lights.

The second light may be a red light and the third light may be a green light. In detail, the light conversion member 400 converts a part of the first light into the red light having the wavelength in the range of about 630 nm to about 660 nm, and a part of the first light into the green light having the wavelength in the range of about 520 nm to about 560 nm.

Thus, the first light passing through the light conversion member 400 is combined with the second and third lights converted by the light conversion member 400, so that the white light is generated. That is, the white light is incident into the light guide plate 200 through the combination of the first to third lights.

As shown in FIGS. 2 to 6, the light conversion member 400 includes a tube 410, a sealing member 420, a plurality of first light conversion particles 431, a plurality of second light conversion particles 432, and a matrix 440.

The tube 410 receives the sealing member 420, the first and second light conversion particles 431 and 432 and the matrix 440 therein. That is, the tube 410 may serve as a receptacle to receive the sealing member 420, the first and second light conversion particles 431 and 432 and the matrix 440. In addition, the tube 410 extends in one direction.

The tube 410 may have a rectangular tubular shape. In detail, a section of the tube 410, which is vertical to the length direction of the tube 410, may have the rectangular shape. The tube 410 may have a width of about 0.6 mm and a height of about 0.2 mm. The tube 410 may include a capillary tube.

The tube 410 is transparent. The tube 410 may include glass. In detail, the tube 410 may include a glass capillary tube.

The sealing member 420 is disposed in the tube 410. The sealing member 420 is arranged at an end of the tube 410 to seal the tube 410. The sealing member 420 may include epoxy resin.

The first and second light conversion particles 431 and 432 are provided in the tube 410. In detail, the first and second light conversion particles 431 and 432 are uniformly distributed in the matrix 440 installed in the tube 410.

The light conversion member 400 is divided into two regions R1 and R2 by the first and second light conversion particles 431 and 432. In detail, the first region R1 is defined in the light conversion member 400 by the first light conversion particles 431 and the second region R2 is defined in the light conversion member 400 by the second light conversion particles 432. That is, the light conversion member 400 may include the first and second regions R1 and R2.

The first light conversion particles 431 are mainly distributed in the first region R1 and the second light conversion particles 432 are mainly distributed in the second region R2. For instance, in the first region R1, the ratio of the first light conversion particles 431 to the second light conversion particles 432 is about 7:3 to about 10:0. In more detail, the first light conversion particles 431 are exclusively disposed in the first region R1. In addition, in the second region R2, the ratio of the first light conversion particles 431 to the second light conversion particles 432 is about 3:7 to about 0:10. In more detail, the second light conversion particles 432 are exclusively disposed in the second region R2.

The first and second regions R1 and R2 may extend in the extension direction of the tube 410. That is, the first and second regions R1 and R2 may have the shape extending lengthwise along the tube 410.

In addition, the first region R1 is adjacent to the light emitting diodes 300 and the second region R2 is adjacent to the light guide plate 200. That is, the first region R1 is interposed between the light emitting diodes 300 and the second region R2. Thus, the light emitted from the light emitting diodes 300 is incident into the second region R2 by passing through the first region R1.

The first and second light conversion particles 431 and 432 convert the wavelength of the light emitted from the light emitting diodes 300. The first and second light conversion particles 431 and 432 convert the wavelength of the light incident from the light emitting diodes 300.

The first light conversion particles 431 may have a diameter larger than that of the second light conversion particles 432. Thus, the wavelength of the light converted by the first light conversion particles 431 may be different from the wavelength of the light converted by the second light conversion particles 432.

The first light conversion particles 431 may convert a part of the first light into the second light and the second light conversion particles 432 may convert a part of the first light into the third light.

In more detail, the first light conversion particles 431 can convert the blue light emitted from the light emitting diodes 300 into the red light. In addition, the second light conversion particles 432 can convert the blue light emitted from the light emitting diodes 300 into the green light.

For instance, the first light conversion particles 431 can convert the blue light into the red light having the wavelength in the range of about 630 nm to about 660 nm. In addition, the second light conversion particles 432 can convert the blue light into the green light having the wavelength in the range of about 520 nm to about 560 nm.

Therefore, the first region R1 converts the first light into the second light and the second region R2 converts the first light into the third light. At this time, the second light has the wavelength longer than that of the third light.

The first region R1 is closer to the light emitting diodes 300 than the second region R1. Thus, the second light converted by the first region R1 is incident into the light guide plate 200 through the second region R2. Since the second light has the relatively long wavelength, the light loss may be reduced when the second light passes through the second region R2.

In addition, since the second light has the relatively long wavelength, the wavelength of the light may not be changed when the second light passes through the second region R2. That is, the second light may not be converted by the second light conversion particles 432.

Further, since the first light conversion particles 431 having the larger diameter are disposed in the first region R1 closer to the light emitting diodes 300, the light conversion member 400 may prevent the two-step wavelength conversion, so the energy loss can be reduced.

The first and second light conversion particles 431 and 432 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent. The quantum dots can be synthesized through the chemical wet scheme.

The matrix 440 surrounds the first and second light conversion particles 431 and 432. In detail, the light conversion particles are uniformly distributed in the matrix 440. The matrix 440 includes polymer. The matrix 440 is transparent. That is, the matrix 440 includes transparent polymer.

The matrix 440 is disposed in the tube 410. In detail, the matrix 440 is fully filled in the tube 410. The matrix 440 may adhere to an inner surface of the tube 410.

An air layer 450 is formed between the sealing member 420 and the matrix 440. The air layer 450 is filled with nitrogen. The air layer 450 performs the damping function between the sealing member 420 and the matrix 440.

The optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is installed in the mold frame 10 and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the first and second regions R1 and R2 are separately defined in the light conversion member 400 to separately convert the second light and the third light.

In addition, the second light having the relatively long wavelength is primarily emitted from the first region R1 of the light conversion member 400 and then the third light having the relatively short wavelength is emitted from the second region R2.

Thus, the LCD according to the embodiment can improve the brightness by employing the light conversion member 400 having the first and second regions R1 and R2 depending on the wavelength of the light.

Although the above embodiment has been described while focusing on the two regions R1 and R2, the embodiment is not limited thereto. For instance, the light conversion member 400 may have at least three regions. In this case, the three regions may convert the first light into the lights having wavelengths different from each other.

FIGS. 7 to 9 are sectional views showing the manufacturing process for the light conversion member according to the first embodiment. In the following description, the description about the light conversion member according to the previous embodiment will be basically incorporated by reference.

Referring to FIG. 7, first and second resin compositions 441 and 442 are prepared. The first and second resin compositions 441 and 442 may include photo-curable resin. In addition, the first and second resin compositions 441 and 442 may include silicon resin.

The first resin composition 441 includes the first light conversion particles 431 and the second resin composition 442 includes the second light conversion particles 432. In addition, the first and second resin compositions 441 and 442 can be accommodated in a bath 40 while forming an interfacial surface therebetween.

Referring to FIG. 8, internal pressure of the tube 410 is reduced, and an inlet of the tube 410 is immersed in the interfacial surface between the first and second resin compositions 441 and 442. Then, ambient pressure is increased, so the first and second resin compositions 441 and 442 are simultaneously introduced into the tube 410.

Referring to FIG. 9, a part of the first and second resin compositions 441 and 442 introduced into the tube 410 is removed and the inlet of the tube 410 becomes empty.

After that, the first and second resin compositions 441 and 442 introduced into the tube 410 is cured by UV light so that the matrix 440 can be formed.

Then, epoxy resin composition is introduced into the inlet of the tube 410. The introduced epoxy resin composition is cured so that the sealing member 420 is formed. The process for forming the sealing member 420 is performed under the nitrogen atmosphere, so the air layer 450 including nitrogen is formed between the sealing member 420 and the matrix 440.

In this manner, the light conversion member 400 including the first region R1 having the first light conversion particles 431 and the second region R2 having the second light conversion particles 432 can be provided.

FIG. 10 is a perspective view showing a light conversion member according to the second embodiment, FIG. 11 is a sectional view taken along line D-D' of FIG. 10 and FIG. 12 is a sectional view taken along line E-E' of FIG. 10. In the following description, the description about the LCD according to the previous embodiment will be basically incorporated by reference and the light conversion member will be additionally explained.

Referring to FIGS. 10 to 12, the tube 410 of the light conversion member 402 according to the present embodiment includes a partition wall 412. Due to the partition wall 412, the internal area of the tube 410 is divided into a first receiving section 411a and a second receiving section 411b. In addition, a plurality of first light conversion particles 431 and a first matrix 443 are disposed in the first receiving section 411a and a plurality of second light conversion particles 432 and a second matrix 444 are disposed in the second receiving section 411b.

The first light conversion particles 431 are distributed in the first matrix 443 and the first region R1 is defined by the first light conversion particles 431. In addition, the second light conversion particles 432 are distributed in the second matrix 444 and the second region R2 is defined by the second light conversion particles 432.

As a result, the first region R1 is disposed in the first receiving section 411a and the second region R2 is disposed in the second receiving section 411b. That is, the partition wall 412 is disposed between the first and second regions R1 and R2.

The partition wall 412 extends in the extension direction of the exit surface of the light emitting diodes 300. For instance, the partition wall 412 faces the exit surface in parallel to the exit surface.

In addition, the partition wall 412 may extend in the extension direction of the incident surface of the light guide plate 200. For instance, the partition wall 412 faces the incident surface of the light guide plate 200 in parallel to the incident surface of the light guide plate 200.

Further, the inlet of the first receiving section 411a is opposite to the inlet of the second receiving section 411b. In detail, the inlet of the first receiving section 411a is disposed at one end of the tube 410 and the inlet of the second receiving section 411b is disposed at the other end of the tube 410.

The resin composition including the first light conversion particles 431 is injected into the first receiving section 411a and the resin composition including the second light conversion particles 432 is injected into the second receiving section 411b. Then, the first and second resin compositions are cured, so that the first and second matrixes 443 and 444 can be formed.

The first region R1 is precisely distinctive from the second region R2 due to the partition wall 412. That is, the first light conversion particles 431 are distinctive from the second light conversion particles 432 due to the partition wall 412.

Therefore, the light conversion member 402 according to the present embodiment may have the improved light conversion efficiency and the LCD including the light conversion member 402 may have the improved brightness.

FIG. 13 is a sectional view showing a light emitting diode, a light conversion member and a light guide plate according to the third embodiment, FIG. 14 is a perspective view showing a light conversion member according to the third embodiment, and FIG. 15 is a sectional view taken along line F-F' of FIG. 14. In the following description, the description about the LCD according to the previous embodiments will be basically incorporated by reference and the light conversion member will be additionally explained.

Referring to FIGS. 13 to 15, the first region R1 of the light conversion member 403 according to the present embodiment is disposed on the second region R2. That is, the first and second regions R1 and R2 are disposed in parallel to each other on the basis of the travelling direction of the first light emitted from the light emitting diodes 300.

Thus, a surface of the first region R1, which faces the light emitting diodes 300, may be aligned on the same plane with a surface of the second region R2, which faces the light emitting diodes 300. That is, the first region R1 is disposed on a part of the exit surface of the light emitting diodes 300 and the second region R2 is disposed on another part of the exit surface of the light emitting diodes 300.

In addition, a surface of the first region R1, which faces the light guide plate 200, may be aligned on the same plane with a surface of the second region R2, which faces the light guide plate 200. That is, the first region R1 is disposed on a part of the incident surface of the light guide plate 200 and the second region R2 is disposed on another part of the incident surface of the light guide plate 200.

Therefore, a part of the first light emitted from the light emitting diodes 300 may be incident into the first region R1 without passing through the second region R2. In addition, another part of the first light emitted from the light emitting diodes 300 may be incident into the second region R2 without passing through the first region R1.

In this manner, the light conversion member 403 according to the embodiment may specify the first and second regions R1 and R2 based on the wavelength of the light. In particular, the first and second regions R1 and R2 are not sequentially disposed in the travelling direction of the first light, but disposed in parallel to each other.

Thus, the second light converted by the first region R1 only passes through the first region R1 and the third light converted by the second region R2 only passes through the second region R2.

As a result, the light conversion member 403 according to the embodiment may have the high conversion efficiency and the LCD according to the embodiment may have the improved brightness.

In addition, although the above embodiment has been described while focusing on the two regions R1 and R2, the embodiment is not limited thereto. For instance, the light conversion member 403 may have at least three regions. In this case, the three regions may convert the first light into the lights having wavelengths different from each other.

FIG. 16 is a perspective view showing a light conversion member according to the fourth embodiment, FIG. 17 is a sectional view taken along line G-G' of FIG. 16, and FIG. 18 is a sectional view taken along line H-H' of FIG. 16. In the following description, the description about the LCD according to the previous embodiments will be basically incorporated by reference and the light conversion member will be additionally explained.

Referring to FIGS. 16 to 18, the tube 413 of the light conversion member 404 according to the present embodiment includes a partition wall 414. Due to the partition wall 414, the internal area of the tube 413 is divided into a first receiving section 413*a* and a second receiving section 413*b*. In addition, a plurality of first light conversion particles 431 and a first matrix 443 are disposed in the first receiving section 413*a* and a plurality of second light conversion particles 432 and a second matrix 444 are disposed in the second receiving section 413*b*.

The first light conversion particles 431 are distributed in the first matrix 443 and the first region R1 is defined by the first light conversion particles 431. In addition, the second light conversion particles 432 are distributed in the second matrix 444 and the second region R2 is defined by the second light conversion particles 432.

As a result, the first region R1 is disposed in the first receiving section 413*a* and the second region R2 is disposed in the second receiving section 413*b*. That is, the partition wall 413 is disposed between the first and second regions R1 and R2.

The partition wall 414 extends while crossing the exit surface of the light emitting diodes 300. For instance, the partition wall 414 may vertically cross the exit surface.

In addition, the partition wall 414 may extend while crossing the incident surface of the light guide plate 200. For instance, the partition wall 414 may vertically cross the incident surface of the light guide plate 200.

Further, the inlet of the first region R1 is opposite to the inlet of the second region R2. In detail, the inlet of the first region R1 is disposed at one end of the tube 413 and the inlet of the second region R1 is disposed at the other end of the tube 413.

In addition, the inlet of the first receiving section 413*a* is opposite to the inlet of the second receiving section 413*b*. In detail, the inlet of the first receiving section 413*a* is disposed at one end of the tube 413 and the inlet of the second receiving section 413*b* is disposed at the other end of the tube 413.

The first resin composition 441 including the first light conversion particles 431 is injected into the first receiving section 413*a* and the second resin composition 442 including the second light conversion particles 432 is injected into the second receiving section 413*b*. Then, the first and second resin compositions 441 and 442 are cured, so that the first and second matrixes 443 and 444 can be formed.

The first region R1 is precisely distinctive from the second region R2 due to the partition wall 414. That is, the first light conversion particles 431 are distinctive from the second light conversion particles 432 due to the partition wall 414.

Therefore, the light conversion member 404 according to the present embodiment may have the improved light conversion efficiency and the LCD including the light conversion member 404 may have the improved brightness.

FIG. 19 is a sectional view showing a light emitting diode, a light conversion member and a light guide plate according to the fifth embodiment, and FIG. 20 is a sectional view showing a light emitting diode, a light conversion member and a light guide plate according to the sixth embodiment. In the following description, the description about the LCD according to the previous embodiments will be basically incorporated by reference and the light conversion member will be additionally explained.

Referring to FIG. 19, the light conversion member 400*a* according to the present embodiment includes first and second light conversion members 405 and 406, which are bonded with each other.

The first and second light conversion members 405 and 406 are sequentially disposed in the travelling direction of the first light emitted from the light emitting diodes 300. That is, the first light emitted from the light emitting diodes 300 may sequentially pass through the first and second light conversion members 405 and 406.

The first light conversion member 405 includes a first tube 415, first light conversion particles 431 and a first matrix 443.

The second light conversion member 406 includes a second tube 416, second light conversion particles 432 and a second matrix 444.

The first and second tubes 415 and 416 are bonded with each other by an adhesive member 460. The adhesive member 460 may adhere to the first and second tubes 415 and 416. The adhesive member 460 is transparent. The first light conversion particles 431 are uniformly distributed in the first matrix 443. The first light conversion particles 431 and the first matrix 443 are disposed in the first tube 415.

The second light conversion particles 432 are uniformly distributed in the second matrix 444. The second light conversion particles 432 and the second matrix 444 are disposed in the second tube 416.

Referring to FIG. 20, the light conversion member 400b includes first and second light conversion members 407 and 408, which are longitudinally bonded with each other. That is, the first and second light conversion members 407 and 408 are arranged in parallel to each other in the travelling direction of the first light.

Thus, a part of the first light passes through the first light conversion member 407 without passing through the second light conversion member 408. In addition, another part of the first light passes through the second light conversion member 408 without passing through the first light conversion member 407.

In this manner, in order to manufacture the light conversion members 400a and 400b according to the embodiments, the light conversion members 405, 406, 407 and 408 are individually prepared according to the wavelength of the light and then bonded with each other. Therefore, the light conversion members 400a and 400b according to the embodiments can be readily manufactured.

FIG. 21 is a perspective view showing a light conversion member according to the seventh embodiment and FIG. 22 is a sectional view taken along line I-I' of FIG. 21. In the following description, the description about the LCD according to the previous embodiments will be basically incorporated by reference and the light conversion member will be additionally explained.

Referring to FIGS. 21 and 22, the light conversion member 409 according to the present embodiment includes a plurality of first regions R1 and second regions R2.

The first and second regions R1 and R2 may be alternately arranged. In detail, the first and second regions R1 and R2 may be alternately arranged in a row in the extension direction of the tube 410.

That is, the first and second regions R1 and R2 are sequentially disposed in the tube 410 in the extension direction of the tube 410. In more detail, the first regions R1 are disposed between the second regions R2, respectively.

In order to form the light conversion member 409 according to the present embodiment, the first resin composition 441 including the first light conversion particles 431 and the second resin composition 442 including the second light conversion particles 432 can be alternately injected into the tube. Then, the first and second resin compositions are cured by the UV ray, so that the light conversion member 409 according to the embodiment can be formed.

Although the above embodiment has been described while focusing on the light conversion member 409 including the first and second regions R1 and R2, the embodiment is not limited thereto. For instance, the light conversion member 409 may further include a plurality of third regions. In this case, the third regions may convert the first light into the fourth light. In addition, the first regions R1, the second regions R2 and the third regions are sequentially and alternately arranged in the length direction of the tube 410.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
   a light source;
   a light conversion member to convert a wavelength of light generated from the light source; and
   a light guide plate spaced from the light source,
   wherein the light source includes a plurality of LEDs arranged in line with each other in a direction,
   wherein the light conversion member is between the plurality of LEDs and the light guide plate,
   wherein the light conversion member comprises:
      at least a rectangular tube, each of which extends in a direction in which the plurality of LEDs are arranged and comprises:
         an inlet;
         a sealing member disposed at the inlet to seal the inlet;
         an air layer in the tube;
         a first region to convert a first light generated from the light source into a second light, the first region comprising a first matrix with first light conversion particles dispersed therein; and
         a second region to convert the first light generated from the light source into a third light, the second region comprising a second matrix with second light conversion particles dispersed therein,
      wherein the first and second light conversion particles comprise quantum dots,
      wherein the air layer is disposed between the sealing member and the first and second regions,
      wherein the first and second regions extend in an extension direction of the tube,
      wherein the first and second regions contact each other,
      wherein the first region comprises:
         a first incident surface facing the light source; and
         a first exit surface opposite to the first incident surface,
      wherein the second region comprises:
         a second incident surface facing the light source; and
         a second exit surface opposite to the second incident surface, wherein the first and second incident surfaces are disposed in parallel to each other on the basis of a travelling direction of the first light emitted from the light source, wherein the first incident surface is aligned on a same incident plane with the second incident surface, and the first exit surface is aligned on a same exit plane with the second exit surface, and wherein the inlet is disposed at a side surface of the rectangular tube, and the side surface is perpendicular to the first and second incident surfaces.

2. The display device of claim 1, further comprising a partition wall interposed between the first region and the second region.

3. The display device of claim 1, wherein the first and second regions are interposed between the light source and light guide plate.

4. The display device of claim 1, wherein the first region is disposed on a part of an exit surface of the light source, and the second region is disposed on another part of the exit surface of the light source.

5. The display device of claim 1, wherein the second light has a wavelength longer than a wavelength of the third light.

6. A light conversion member comprising:
at least a rectangular tube each of which comprises:
   an inlet;
   a sealing member disposed at the inlet to seal the inlet;
   an air layer in the tube;
   a plurality of first light conversion particles disposed in a first region in the tube;
   a plurality of second light conversion particles disposed in a second region in the tube;
   a first matrix in the first region; and
   a second matrix in the second region,
wherein the air layer is disposed between the sealing member and the first and second regions,
wherein the first and second regions extend in an extension direction of the tube,
wherein the first and second regions contact each other,
wherein the first region comprises a first incident surface and a first exit surface opposite to the first incident surface,
wherein the second region comprises a second incident surface and a second exit surface opposite to the second incident surface,
wherein the first and second incident surfaces are disposed in parallel to each other on the basis of a travelling direction of a first light emitted from a light source,
wherein the first incident surface is aligned on a same incident plane with the second incident surface, and the first exit surface is aligned on a same exit plane with the second exit surface, and
wherein the inlet is disposed at a side surface of the rectangular tube, and the side surface is perpendicular to the first and second incident surfaces.

7. The light conversion member of claim 6, wherein the first light conversion particles have a diameter larger than a diameter of the second light conversion particles.

* * * * *